United States Patent [19]
Fitchmun et al.

[11] Patent Number: 5,538,757
[45] Date of Patent: Jul. 23, 1996

[54] METHOD OF MAKING THERMOPLASTIC COMPOSITE MATERIAL

[75] Inventors: Douglas R. Fitchmun, Woodland Hills; Niran Perera, Simi Valley; Thomas W. Smith, Canoga Park, all of Calif.

[73] Assignee: Medical Materials Corporation, Camarillo, Calif.

[21] Appl. No.: 361,749

[22] Filed: Dec. 22, 1994

Related U.S. Application Data

[62] Division of Ser. No. 55,518, Apr. 30, 1993.

[51] Int. Cl.$^6$ .................................................. B05D 1/00
[52] U.S. Cl. .......................... 427/211; 427/365; 427/369; 427/371; 427/385.5; 427/428
[58] Field of Search ............................ 427/211, 365, 427/369, 371, 385.5, 428

Primary Examiner—Bernard Pianalto
Attorney, Agent, or Firm—Ellsworth R. Roston; Charles H. Schwartz

[57] ABSTRACT

A thermoplastic composite material may be formed by supplying the thermoplastic material to the opposite surfaces of the fabric material and by then passing the resultant material through the spaces between progressive pairs of rollers. The rollers in each progressive pair have a decreased spacing relative to the rollers in the previous pair so as to squeeze the thermoplastic material into the interstices between the fabric threads without compressing the fabric material. The resultant material may also be moved in a tortuous path, such as formed by a pair of rollers defining an S-configuration relative to the resultant material, to engage the opposite surfaces of the resultant material and squeeze air from the resultant material without compressing the fabric.

8 Claims, 1 Drawing Sheet

METHOD OF MAKING THERMOPLASTIC COMPOSITE MATERIAL

This is a division, of application Ser. No. 08/055,518, filed Apr. 30, 1993.

This invention relates to thermoplastic composite materials. More particularly, the invention relates to thermoplastic composite materials which have a light weight, a small thickness and yet are strong and stiff and capable of being formed easily into any desired shape. The invention also relates to a method of forming such a material.

It is often desirable to form a sheet of plastic material into a complex shape without any rippling or buckling of the material. It is also desirable to make such sheet as light (from a weight standpoint), thin and strong as possible. It is also desirable to form a sheet with the above characteristics into the complex shape in a relatively simple process so that the costs of providing the complex shape in the sheet are low and so that the yield of the final product is high.

A sheet with the properties discussed may have a wide variety of different uses. For example, it may be shaped to conform to the shape of a foot. Alternatively, the sheet may be shaped to provide an arch support in a shoe. As another example, the sheet may be shaped to be disposed as a spring element in the sole of a wearer's shoe. Although the examples have been limited to uses in shoes, this is only one of a number of different fields or areas in which such material can be used.

Thermoplastic materials have been used to provide sheets with the properties discussed above. To obtain a desired shape, a mold is provided with the desired shape. The thermoplastic material is then formed into the desired shape by applying heat and pressure to the thermoplastic material to move the material into the mold and to have the material adopt the configuration of the mold. Suitable thermoplastic materials for forming into complex shapes may be any suitable thermoplastic material such as acrylics, polypropylenes and polyethylenes.

Thermoplastic materials are advantageous because they can be reshaped if it is desired to change the configuration somewhat after the material has been initially shaped through the application of heat and pressure. However, thermoplastic materials are distinctly disadvantageous in that they have to be provided with a considerable thickness in order to provide the necessary rigidity in such applications as orthotics. For example, thicknesses of 0.120" to 0.200" may be required. Unfortunately, such thick materials are heavy and are generally too thick to be disposed in foot gear. Furthermore, the thermoplastic materials are not as durable and resistant to breaking as would otherwise be required. The thermoplastic materials also sometimes buckle and ripple when they are transformed into complex shape.

Thermosetting materials have also been used to provide complex shapes such as for footwear and orthotic applications. An advantage of a thermosetting material is that it can be made quite thin to obtain the desired shape. For example, the thickness of the thermosetting material may be in the order of 0.065" to 0.080". One problem with shaping thermosetting materials into complex shapes is that the thermosetting materials have to be shaped properly the first time. The reason is that the thermosetting materials cannot be reshaped after they have been heated to a temperature for initially shaping the material. This problem has severely limited the use of the thermosetting material to provide complex shapes. Another problem often is that the thermosetting materials tend to be heavy even though they are thin.

Until recently, because of the problems discussed above for thermosetting materials, complex shapes such as for orthotic inserts have generally been formed from thermoplastic materials such as acrylics and polypropylenes. The orthotic inserts have been formed by initially making a plaster mold from the patient's foot. This plaster mold has formed a negative image of the patient's foot. A positive mold has then been made from the negative plaster mold. Thermoplastic material has then been transformed into the desired shape by using heat and pressure to conform the thermoplastic material to the positive mold.

U.S. Pat. No. 4,778,717 issued to Douglas R. Fitchman on Oct. 18, 1988, for a "Thermoplastic Thermoformable Composite Material" and assigned of record to the assignee of record of this application discloses and claims a composite thermoplastic material which can be easily formed, and even reformed if necessary, at elevated temperatures to any desired complex shape. The composite material is light and strong and is able to be thermally deformed, and even reformed, to any desired shape with relatively minimal buckling or rippling. U.S. Pat. No. 4,778,717 is made of reference to provide a background for the improvement constituting this invention.

The composite material of U.S. Pat. No. 4,778,717 is formed from a core material of a thermoplastic resin and a pair of layers of fabric material disposed on each side of the core material. Layers of a thermoplastic material envelope and impregnate the layers of the fabric material and bond the layers of the fabric material to the core. The layers of the fabric material have a total thickness sufficient to impart strength and rigidity to the composite material. The core is of a sufficient thickness to provide for a shaping of the composite thermoplastic material at an elevated temperature to any desired shape or configuration with relatively little rippling or buckling of the fabric material. The thermoplastic composite material of U.S. Pat. No. 4,778,717 has received widespread acceptance for orthotics. The thermoplastic material of U.S. Pat. No. 4,778,717 generally has a thickness of at least eighty five mils (0.085"), primarily because the thermoplastic core has a relatively large thickness to provide for a molding of the material into any desired shape without any rippling or buckling of the material.

This invention provides a thermoplastic composite material which may be considered to constitute an improvement over the thermoplastic composite material of U.S. Pat. No. 4,778,717. The thermoplastic composite material of this invention is significantly thinner and lighter than the thermoplastic composite material of U.S. Pat. No. 4,778,717. In spite of this, it is strong and stiff so that it is able to support great weights without any deterioration in its properties, such as when it is used in arch supports in shoes. It is able to be molded, and remolded if necessary, to any desired shape without any rippling or buckling of the material. It is able to be formed reliably in a relatively simple process.

In one embodiment, a fabric material, preferably woven, is formed from a suitable material such as glass, carbon or aramid. The fabric material is preferably not compressed and may be provided with a thickness in the order of approximately twelve mils (0.012") to fifty two mils (0.052"). A thermoplastic material preferably made from a suitable material such as an acrylic, a polycarbonate or ABC envelopes and impregnates the fabric in the spaces between the fabric threads and bonds the fabric material to the thermoplastic material. There are no air pockets in the thermoplastic material or between the thermoplastic material and the core. The total thickness of the thermoplastic composite material may be in the order of approximately thirty mils (0.030) to about fifty five mils (0.055").

The thermoplastic composite material may be formed by supplying the thermoplastic material to the opposite surfaces of the fabric material and by then passing the resultant material through the spaces between progressive pairs of rollers. The rollers in each progressive pair have a decreased spacing relative to the rollers in the previous pairs so as to squeeze the thermoplastic material into the interstices between the fabric between the fabric threads without compressing the fabric material. The resultant material may also be moved in a tortuous path, such as formed by a pair of rollers defining an S-configuration relative to the resultant material, to engage the opposite surfaces of the resultant material and squeeze air from the resultant material without compressing the fabric.

Figure 1:
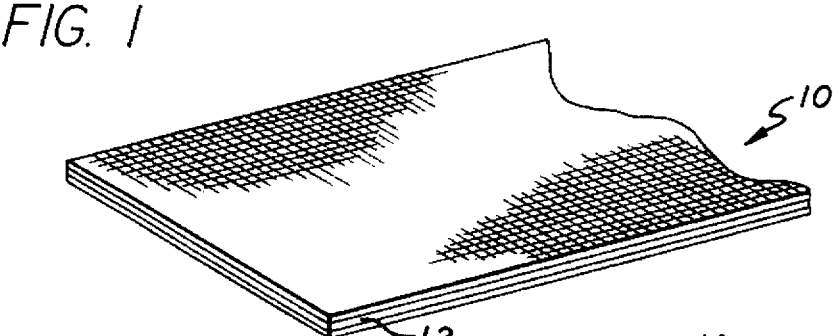
FIG. 1 is a fragmentary perspective view of a thermoplastic composite material constituting one embodiment of the invention.
Figure 2:
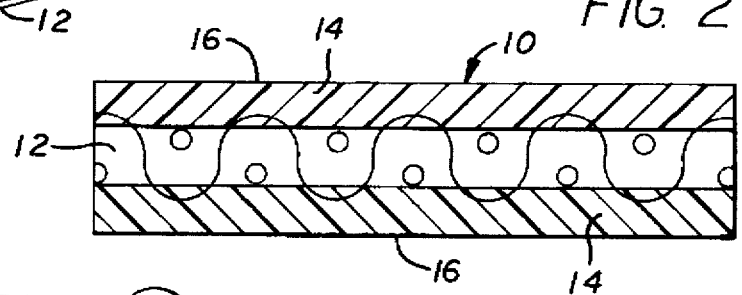
FIG. 2 is an enlarged sectional view of the thermoplastic composite material shown in FIG. 1.

In one embodiment of the invention, a thermoplastic composite material generally indicated at 10 is provided. The material 10 includes a fabric 12 which preferably has a thickness in the order of twelve mils (0.012") to fifty mils (0.050") and which preferably exists in a non-compressed form. The fabric 10 may be made from a suitable material such as carbon, glass or aramid or from combinations of these materials. The fabric 12 is preferably woven such as in a plain weave (e.g. one over and one under) or a dual weave (two over and two under) or in a twill weave (more than one over and one under) or in any other suitable weave.

The fabric 12 is impregnated with thermoplastic material 14 which may be formed from suitable material such as an acrylic, a polycarbonate or ABS. Preferably the thermoplastic material 14 is an acrylic. The thermoplastic material 14 preferably envelopes the fabric 12 so as to define smooth outer surfaces 16. The thermoplastic material 14 is bonded to the fabric 12. Preferably no air pockets exist in the thermoplastic material 14 or in the space between the thermoplastic material and the threads of the woven fabric.

The thickness of the thermoplastic composite material 10 formed from the fabric 12 and the thermoplastic material 14 may be in the order of approximately thirty mils (0.030") to approximately fifty five mils (0.055"). Preferably the thickness of the composite material 10 is approximately forty six mils (0.046") and the thickness of the fabric material is preferably approximately forty one mils (0.041").

The thermoplastic composite material 10 has certain important advantages. By maintaining the fabric 12 in a non-compressed condition, the thermoplastic composite material is quite stiff or rigid even though the material is relatively thin. For example, the stiffness or rigidity of the thermoplastic composite material 10 has been found to be about two and one half times greater than a thermoplastic composite material formed when the fabric is depressed. However, the relatively great thickness of the thermoplastic material 14 above the opposite external surfaces of the fabric 12 provides for an ability of the thermoplastic composite material 10 to be shaped to any desired configuration without any rippling or buckling of the material. The elimination of air pockets in the material 10 also enhances the stiffness or rigidity of the material and facilitates the molding of the material to any desired shape without any rippling or buckling.

Figure 3:
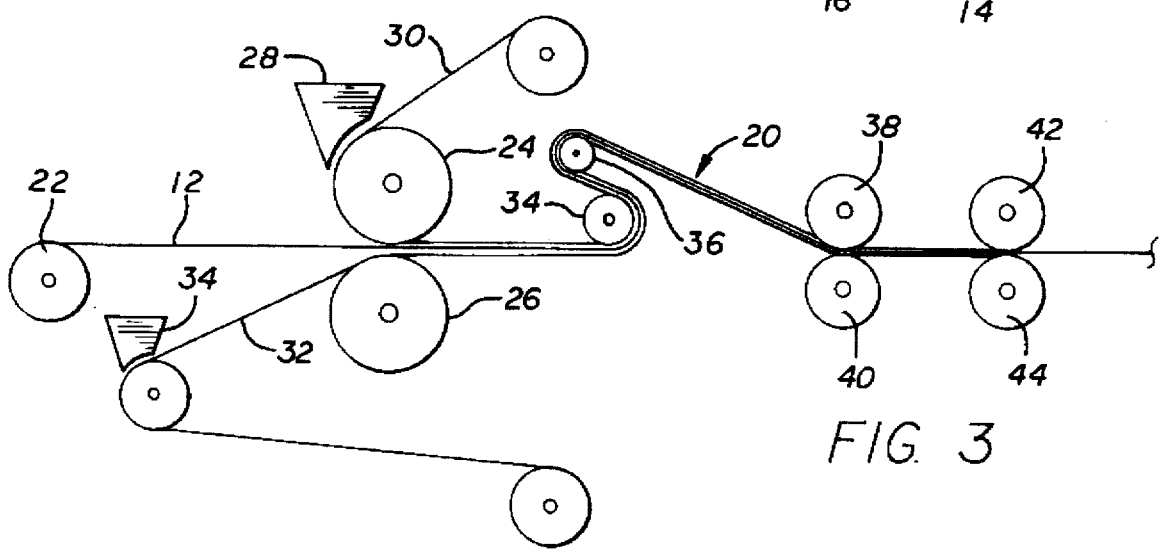
FIG. 3 is a schematic view of one form of apparatus for forming the thermoplastic composite material shown in FIGS. 1 and 2.

FIG. 3 illustrates one suitable form of apparatus, generally indicated at 20, for forming the thermoplastic composite material 10. The apparatus 20 provides for the introduction of the fabric 12 from a roll 22 into the space between a pair of rollers 24 and 26. Resin such as an acrylic is introduced from a bin 28 to a sheet 30 made from a suitable material such as Mylar. Mylar is desirable because it is relatively neutral and has a high melting temperature. The sheet 30 passes through the space between the rollers 24 and 26 and introduces the resin to one surface of the fabric 12. In like manner, resin is introduced to the opposite surface of the fabric 12 by a sheet 32, preferably Mylar, which also passes through the space between the rollers 24 and 26 and which receives the acrylic from a bin 34. The space between the rollers 24 and 26 is such as to produce a thickness of such as approximately seventy mils (0.070") in the resultant material formed by the resin and the fabric 12. The Mylar sheets 30 and 32 facilitate the impregnation of the resin into the interstices between the threads of the fabric 12.

The resultant material then moves through a tortuous path defined by the positioning of a pair of rollers 34 and 36. As will be seen, this tortuous path may be considered to provide the resultant material with an S-configuration. The roller 34 contacts one surface of the resultant material and squeezes air from the material because of the considerable bending imparted to the resultant material. In like manner, the roller 36 contacts the other surface of the resultant material and squeezes air from the material because of the considerable bending imparted to the material. The rollers 34 and 36 squeeze air out of the material without compressing the fabric 12.

The resultant material then passes into the space between a pair of rollers 38 and 40. The rollers 38 and 40 are separated by a distance to impart a thickness preferably in the order of about fifty five mils (0.055") to the resultant material. The thickness of the resultant material may then be reduced to about forty six mils (0.046") by a pair of rollers 42 and 44. When the thickness of the fabric is preferably about eighteen mils (0.018"), this means that the thickness of the thermoplastic material 14 on each of the surfaces of the fabric 12 is about fourteen mils (0.014").

The thermoplastic composite material 10 formed as described above may be cured in approximately a twenty four (24) hour period starting from a temperature of approximately 100° F. The temperature of the material 10 may be progressively raised from a temperature of approximately 100° F. to a suitable temperature such as a temperature of approximately 130° F. over a suitable period of time such as approximately five (5) hours. The temperature may then be maintained at the temperature of approximately 130° F. for a suitable period of time such as approximately sixteen (16) hours. The temperature of the thermoplastic 10 may then be progressively raised from approximately 130° F. to a suitable temperature such as approximately 250° F. over a suitable period of time such as approximately two (2) hours. The temperature may thereafter be maintained at approximately 250° F. for a suitable period of time such as approximately two (2) hours. The thermoplastic composite material 10 may subsequently be cooled in air to ambient temperatures. A relatively low weight loss such as approximately 0.31% may be experienced in the composite material 10 during the curing process.

To form the composite material 10 into any desired shape, the material is heated to a suitable temperature such as approximately 360° F. to 390° F. for a suitable period of time such as approximately three (3) to five (5) minutes. The composite material 10 may then be shaped to any desired configuration without any rippling or buckling. For example, the composite material 10 may be shaped to form an orthotic insert generally indicated at 50. However, it is important that these orthotic inserts be post formable so that adjustments in their shape can be made in the field if there are any problems with the inserts after the inserts have been applied to the user's feet. The formation of the orthotic insert 50 from the composite material 10 allows for such port forming.

The orthotic insert 50 includes a base member 52 made from the composite material 10, which is transformed to the desired shape after being provided in sheet form. A heel portion 54 is attached to the base member 52. The heel portion 54 may be made in a conventional manner. The heel portion 54 may be molded from a rigid plastic material to operate as a heel support. A soft durable covering 56 covers the base member 52. The soft durable covering material 56 may be made from any suitable leather-like material to provide for a comfortable and aesthetic surface adjacent the foot of the orthotic user.

Figure 4:
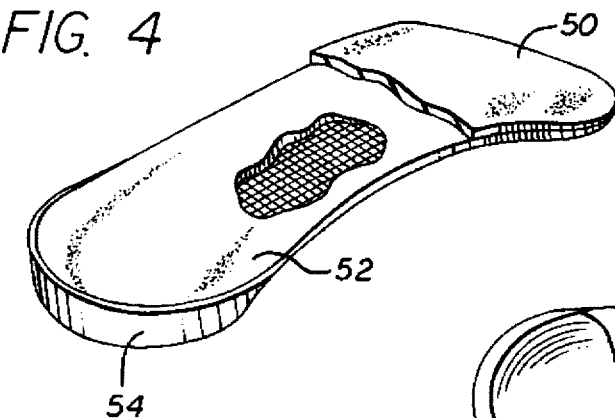
FIG. 4 is a schematic perspective view of a completed orthotic insert made from a thermoplastic composite material in accordance with the teachings of this invention.
Figure 5:
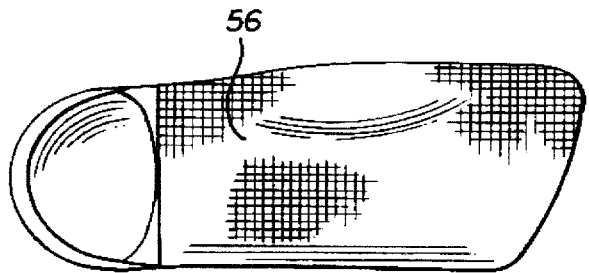
FIG. 5 is a bottom plan view of the orthotic insert of FIG. 4.

FIGS. 4 and 5 also illustrate that the base member 52 formed from the opposite material 10 has a complex shape conforming to the bottom surface of the foot of the user of the orthotic insert 50. Each such orthotic insert 50 has to be made for an individual user because of its complex shape. In general, such orthotic inserts 50 are provided by medical personnel who specialize in fitting such inserts to a user to provide the proper support to the user during various activities.

Typically, plaster molds of the user's feet are made and sent to a laboratory. The laboratory then makes castings from the molds. The castings thereby represent the bottoms of the user's feet. Orthotic inserts 50 are then formed to provide for the proper inserts conforming to the bottom of the user's feet. These orthotic inserts constitute finished products.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. A method of forming a thermoplastic thermoformable composite material, including the steps of:

providing a fabric material having first and second opposite surfaces and disposed in a non-compressed relationship, disposing a thermoplastic material on the opposite surfaces of the fabric material in the non-compressed relationship to form a resultant material, and progressively squeezing the first and second opposite surfaces of the resultant material to eliminate air from the thermoplastic material and from the space between the thermoplastic material and the fabric material without compressing the fabric material, and curing the thermoplastic material.

2. A method as set forth in claim 1 wherein the progressive squeezing is provided by disposing sheets of material against the opposite surfaces of the resultant material to define a sandwich relationship and passing the sandwich relationship through pairs nip of rollers, the sandwich relationship being movable in a particular direction and wherein the nip rollers in each successive pair in the direction of movement of the sandwich relationship having a progressively decreased spacing.

3. A method as set forth in claim 2 wherein the sandwich relationship is moved past a pair of nip rollers disposed relative to each other in the particular direction for one of the nip rollers in the pair to squeeze the resultant material at the first surface without compressing the fabric material and for the other nip roller to squeeze the resultant material at the second surface without compressing the fabric material.

4. A method as set forth in claim 3 wherein the fabric material is woven and the thermoplastic material is an acrylic.

5. A method as set forth in claim 4 wherein the fabric material has a thickness in the order of approximately twelve mils (0.012") to approximately fifty two mils (0.052") and the thermoplastic composite material has a thickness in the order of thirty mils (0.030") to fifty five mils (0.055").

6. A method as set forth in claim 1 wherein the sandwich relationship is moved past a pair of nip rollers spaced relative to each other in the particular direction for one of the nip rollers in the pair to squeeze the resultant material at the first surface without compressing the fabric material and for the other nip roller in the pair to squeeze the resultant material at the second surface without compressing the fabric material.

7. A method of forming a thermoplastic composite material including the steps of:

applying a thermoplastic material to opposite surfaces of a woven fabric material, squeezing the thermoplastic material into the woven fabric material, without compressing the fabric material, to impregnate the fabric material, bond the thermoplastic material to the fabric material to form the composite material, and eliminate air pockets in the composite material, and curing the composite material.

8. A method as set forth in claim 7 wherein the squeezing of the thermoplastic material includes the steps of moving the fabric material in a particular direction during the application of the thermoplastic material to the woven material and the squeezing of the thermoplastic material into the woven fabric material and wherein the squeezing of the thermoplastic material into the woven fabric material includes the step of moving the composite material in a tortuous path wherein one surface of the composite material is pressed against a first nip roller without compressing the woven material and the other surface of the composite material is pressed against a second nip roller without compressing the woven fabric material.

* * * * *